US008681644B2

(12) United States Patent
Sanayei et al.

(10) Patent No.: US 8,681,644 B2
(45) Date of Patent: Mar. 25, 2014

(54) SYSTEM AND METHOD FOR SPATIAL MULTIPLEXING FOR COORDINATED MULTI-POINT TRANSMISSION

(75) Inventors: Shahab Sanayei, Richardson, TX (US); Mazin Al-Shalash, Frisco, TX (US)

(73) Assignee: FutureWei Technologies, Inc., Plano, TX (US)

( * ) Notice: Subject to any disclaimer, the term of this patent is extended or adjusted under 35 U.S.C. 154(b) by 696 days.

(21) Appl. No.: 12/784,092

(22) Filed: May 20, 2010

(65) Prior Publication Data

US 2011/0286341 A1    Nov. 24, 2011

(51) Int. Cl.
*H04L 12/26* (2006.01)

(52) U.S. Cl.
USPC .................................... 370/252; 455/67.11

(58) Field of Classification Search
USPC ............... 375/347, 267, 211; 455/562.1, 422, 455/67.1; 370/203, 342, 302, 208; 342/354
See application file for complete search history.

(56) References Cited

U.S. PATENT DOCUMENTS

| | | | | |
|---|---|---|---|---|
| 7,120,199 | B2 * | 10/2006 | Thielecke et al. | 375/267 |
| 7,463,673 | B2 * | 12/2008 | Fujii et al. | 375/211 |
| 7,747,285 | B2 * | 6/2010 | Lozano | 455/562.1 |
| 7,916,620 | B2 * | 3/2011 | Park et al. | 370/203 |
| 8,193,975 | B2 * | 6/2012 | Zheng | 342/354 |
| 8,254,359 | B2 * | 8/2012 | Li et al. | 370/342 |
| 8,260,209 | B2 * | 9/2012 | Sanayei | 455/67.11 |
| 2005/0286663 | A1 * | 12/2005 | Poon | 375/347 |
| 2010/0232336 | A1 * | 9/2010 | Choudhury et al. | 370/312 |
| 2011/0070918 | A1 * | 3/2011 | Hafeez | 455/522 |

OTHER PUBLICATIONS

Texas Instruments, "Joint Processing Downlink COMP Precoding Support," 3GPP TSG RAN WG1 #56, R1-090585, Feb. 9-13, 2009, 6 pages, Athens, Greece.

"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, V9.0.0, Mar. 2010, 104 pages.

\* cited by examiner

*Primary Examiner* — Yemane Mesfin
*Assistant Examiner* — Derrick V Rose
(74) *Attorney, Agent, or Firm* — Slater & Matsil, LLP

(57) ABSTRACT

A system and method for spatial multiplexing for coordinated multi-point transmission are provided. A method for communications device operations includes receiving transmissions from at least two access points, measuring channels between the communications device and each of the at least two access points based on the received transmissions, computing beamforming weights based on the measured channels, and transmitting the beamforming weights to the at least two access points. The computing is based on attempting to maximize a capacity of a communications system containing the communications device and the at least two access points with the beamforming weights, and the beamforming weights are used at the at least two access points to beamform transmissions to the communications device using coordinated multi-point transmission.

20 Claims, 10 Drawing Sheets

SYSTEM AND METHOD FOR SPATIAL MULTIPLEXING FOR COORDINATED MULTI-POINT TRANSMISSION

TECHNICAL FIELD

The present invention relates generally to wireless communications, and more particularly to a system and method for spatial multiplexing for coordinated multi-point (CoMP) transmission.

BACKGROUND

Generally, in coordinated multi-point (CoMP) transmission, two or more access points (e.g., base stations, relay nodes, and so forth), each equipped with an antenna array, simultaneously transmit two (or more) streams of data to a recipient. The simultaneous transmissions from the two or more access points may be beamformed with beamforming weights. The beamforming weights may be determined in such a way that an overall link capacity is maximized.

The beamforming weights may be computed at the recipient and may be fedback to the access points. However, the computing of the beamforming weights may be computationally intensive, especially if the recipient has limited computational resources, and may overload the capabilities of the recipient.

Furthermore, the beamforming weights are fedback to the access points for use in beamforming the simultaneous transmissions. In order to reduce feedback overhead, the beamforming weights may need to be quantized, e.g., using codebook quantization. However, to accurately quantize the beamforming weights, augmented codebooks may be needed, which may further tax the capabilities (e.g., the storage space available at the recipient, as well as the computational requirements needed for codebook quantization).

SUMMARY

These and other problems are generally solved or circumvented, and technical advantages are generally achieved, by embodiments of a system and method for spatial multiplexing for coordinated multi-point (CoMP) transmission.

In accordance with an embodiment, a method for communications device operations is provided. The method includes receiving transmissions from at least two access points, measuring channels between the communications device and each of the at least two access points based on the received transmissions, computing beamforming weights based on the measured channels, and transmitting the beamforming weights to the at least two access points. The computing is based on attempting to maximize a capacity of a communications system containing the communications device and the at least two access points with the beamforming weights, and the beamforming weights are used at the at least two access points to beamform transmissions to the communications device using coordinated multi-point transmission.

In accordance with another embodiment, a method for operations at an access point is provided. The method includes transmitting a pilot signal, receiving beamforming weights from a communications device served by the access point, beamforming a transmission with the beamforming weights, and transmitting the beamformed transmission to the communications device. The access point and at least one additional access point is transmitting to the communications device using coordinated multi-point transmission, the beamforming weights are used to beamform transmissions to the communications device, and the beamforming weights are computed at the communications device based on attempting to maximize a capacity of a communications system containing the communications device, the access point, and the at least one additional access point.

In accordance with another embodiment, a communications device is provided. The communications device includes a receiver to be coupled to a receive antenna, a transmitter to be coupled to a transmit antenna, and a controller coupled to the receiver and to the transmitter. The receiver to receive signals detected by the receive antenna, and the transmitter in order to transmit signals with the transmit antenna. The controller measures a channel between the communications device and an access point of a plurality of access points transmitting to the communications device, and computes beamforming weights for use by the plurality of access points transmitting to the communications device in coordinated multi-point transmissions. The controller computes the beamforming weights based on attempting to maximize a capacity of a communications system containing the communications device and the access points.

An advantage of an embodiment is that a technique for computing the beamforming weights with reduced computational requirements is provided. The reduced computation requirements may allow for a relaxation of computation requirements for a recipient of CoMP transmissions, which may need to compute the beamforming weights to provide to transmitters of the CoMP transmissions.

A further advantage of an embodiment is that the beamforming weights may be separately quantized to reduced feedback overhead. Separately quantizing the beamforming weights may simplify the codebook quantization process by requiring a smaller codebook plus reducing a codeword search complexity.

Yet another advantage of an embodiment is that any feedback mechanism may be used to provide the beamforming weights to the access points, including analog and non-codebook based feedback methods.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a Third Generation Partnership Project (3GPP) Long Term Evolution (LTE) compliant communications system supporting CoMP transmission. However, the embodiments may also be applied to other communications systems, such as communications systems adherent to 3GPP LTE-Advanced, WiMAX, and so forth, technical standards.

Figure 1A:
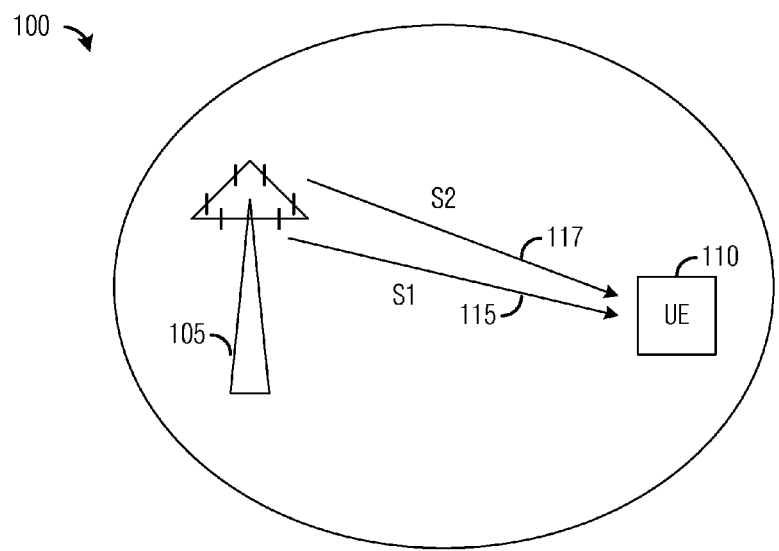
FIG. 1a is a diagram of a communications system participating in CoMP transmission involving two sectors of a single base station.

FIG. 1a illustrates a communications system 100 participating in CoMP transmission involving two sectors of a single base station. Communications system 100 includes a base station 105 and a User Equipment (UE) 110, where UE 110 is a recipient of CoMP transmission from base station 105. UE 110 may be located in a portion of a coverage area of base station 105 such that UE 110 may receive transmissions from multiple neighboring sectors of base station 105.

A first simultaneous transmission from a first sector of base station 105 to UE 110 is shown in FIG. 1a as arrowed line 115, transmitted symbols (information) in first simultaneous transmission are shown as S1. While a second simultaneous transmission from a second sector of base station 105 to UE 110 is shown as arrowed line 117, transmitted symbols in second simultaneous transmission are shown as S2.

Figure 1B:
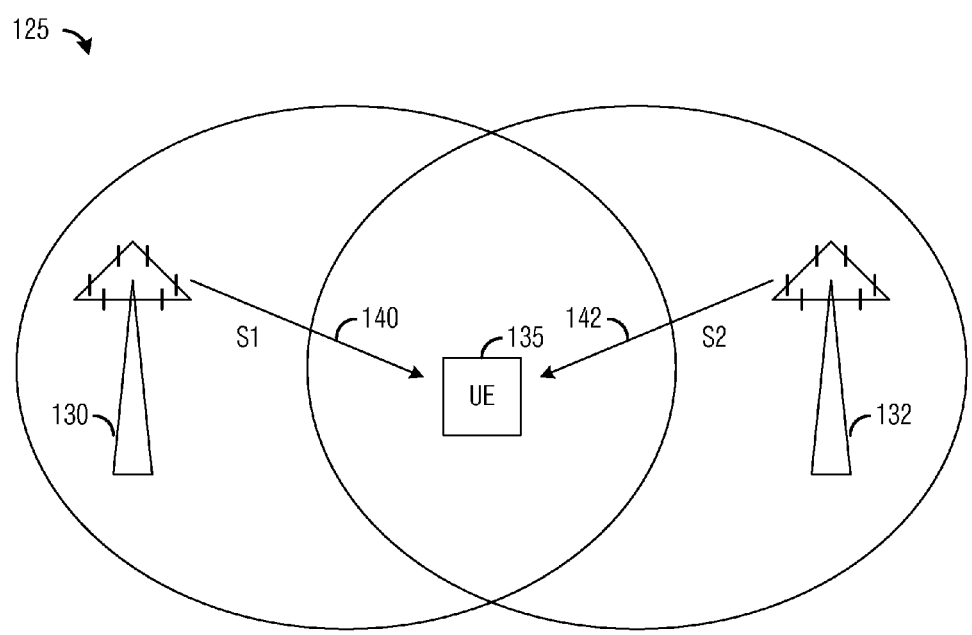
FIG. 1b is a diagram of a communications system participating in CoMP transmission involving sectors from multiple base stations.

FIG. 1b illustrates a communications system 125 participating in CoMP transmission involving sectors from multiple base stations. Communications system 125 includes a first base station 130 and a second base station 132 and a UE 135. UE 135 is a recipient of CoMP transmission from first base station 130 and second base station 132. UE 135 may be located in a portion of a coverage area of first base station 130 and a coverage area of second base station 132 such that UE 135 may receive transmissions from both base stations.

A first simultaneous transmission from first base station 130 to UE 135 is shown in FIG. 1b as arrowed line 140, transmitted symbols in first simultaneous transmission are shown as S1. While a second simultaneous transmission from second base station 132 to UE 135 is shown as arrowed line 142, transmitted symbols in second simultaneous transmission are shown as S2.

Figure 1C:
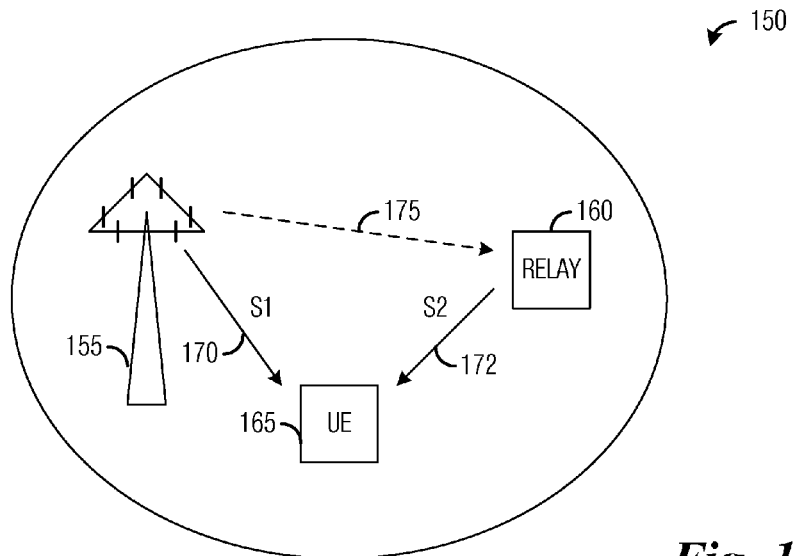
FIG. 1c is a diagram of a communications system participating in CoMP transmission involving a base station and a relay node.

FIG. 1c illustrates a communications system 150 participating in CoMP transmission involving a base station and a relay node. Communications system 150 includes a base station 155 and a relay node 160 and a UE 165. Relay node 160 may be a pseudo-base station in that it operates like a base station, scheduling transmission opportunities for a UE that it is serving. However, relay node 160 does not have its own network resources to allocate, rather, relay node 160 depends on network resources donated by a base station, such as base station 155.

UE 165 is a recipient of CoMP transmission from base station 155 and relay node 160. UE 135 may be located in a portion of a coverage area of base station 155 and a coverage area of relay node 160 such that UE 165 may receive transmissions from both.

A first simultaneous transmission from base station 155 to UE 165 is shown in FIG. 1c as arrowed line 170, transmitted symbols in first simultaneous transmission are shown as S1. While a second simultaneous transmission from relay node 160 to UE 165 is shown as arrowed line 172, transmitted symbols in second simultaneous transmission are shown as S2. As shown in FIG. 1c, second simultaneous transmission from relay node 160 to UE 165 are actually forwarded transmitted symbols provided by base station 155 to relay node 160 (shown as dashed arrowed line 175).

Although the discussion focuses on CoMP transmissions from two access points to a single recipient, CoMP transmissions may occur from any number of access points to a single recipient. The embodiments discussed herein may be operable with any number of access points, such as two, three, four, and so forth. Therefore, the discussion of CoMP transmissions from two access points to a single recipient should not be construed as being limiting to either the scope or the spirit of the embodiments.

In general, a model of a received signal at a UE that is receiving CoMP transmissions from access point one and access point two may be expressed as $$y_1 = \sqrt{P_1} \cdot h_{11}^H q_1 \cdot s_1 + \sqrt{P_2} \cdot h_{12}^H w_2 \cdot n_1$$

$$y_2 = \sqrt{P_1} \cdot h_{21}^H q_1 \cdot s_1 + \sqrt{P_2} \cdot h_{12}^H w_2 \cdot n_1$$

where:
$h_{11}^H$ and $h_{21}^H$ are downlink channel vectors from access point one to the UE's antenna one and two;
$h_{12}^H$ and $h_{22}^H$ are downlink channel vectors from access point two to the UE's antenna one and two;
$w_1^H$ and $w_2^H$ are beamforming weight vectors applied to antenna arrays in access point one and access point two, respectively;
$n_1$ and $n_2$ are additive white Gaussian noises with unit variance;
$y_1$ and $y_2$ are received signals at the UE's antenna one and two;
$s_1$ and $s_2$ are transmitted symbols from access point one and access point two; and
$P_1$ and $P_2$ are total transmit power to the UE from access point one and access point two.

The model of the received signal may be re-written as $$\begin{bmatrix} y_1 \\ y_2 \end{bmatrix} = H \cdot \begin{bmatrix} s_1 \\ s_2 \end{bmatrix} + \begin{bmatrix} n_1 \\ n_2 \end{bmatrix},$$

where $$H = \begin{bmatrix} \sqrt{P_1} \cdot h_{11}^H w_1 & \sqrt{P_2} \cdot h_{12}^H w_2 \\ \sqrt{P_1} \cdot h_{21}^H w_1 & \sqrt{P_2} \cdot h_{22}^H w_2 \end{bmatrix}$$

is an equivalent 2×2 channel.

A capacity of the communications system is expressible as $$C(w_1, w_2) = \log_2 \det(I_2 + H^H H),$$

where $I_2$ is an identity matrix.

It is then desirous to determine $w_1$ and $w_2$ such that a capacity is maximized $$C_{max} = \max_{\substack{w_1, w_2 \\ \|w_1\|=1, \|w_2\|=1}} C(w_1, w_2).$$

An equivalent cost function in terms of $w_1^H$ and $w_2^H$ may be expanded as $$J = \frac{1}{P_1 P_2} \det(I_2 + H^H H)$$
$$= \left(w_1^H A_{11} w_1 \cdot w_2^H A_{22} w_2 - |w_1^H A_{12} w_2|^2\right) +$$
$$\frac{1}{P_2} \cdot w_1^H A_{11} w_1 + \frac{1}{P_1} \cdot w_2^H A_{22} w_2,$$

where $A_{11} = h_{11} h_{11}^H + h_{21} h_{21}^H$, $A_{12} = h_{11} h_{12}^H + h_{21} h_{22}^H$, and $A_{22} = h_{12} h_{12}^H + h_{22} h_{22}^H$.

Figure 2:
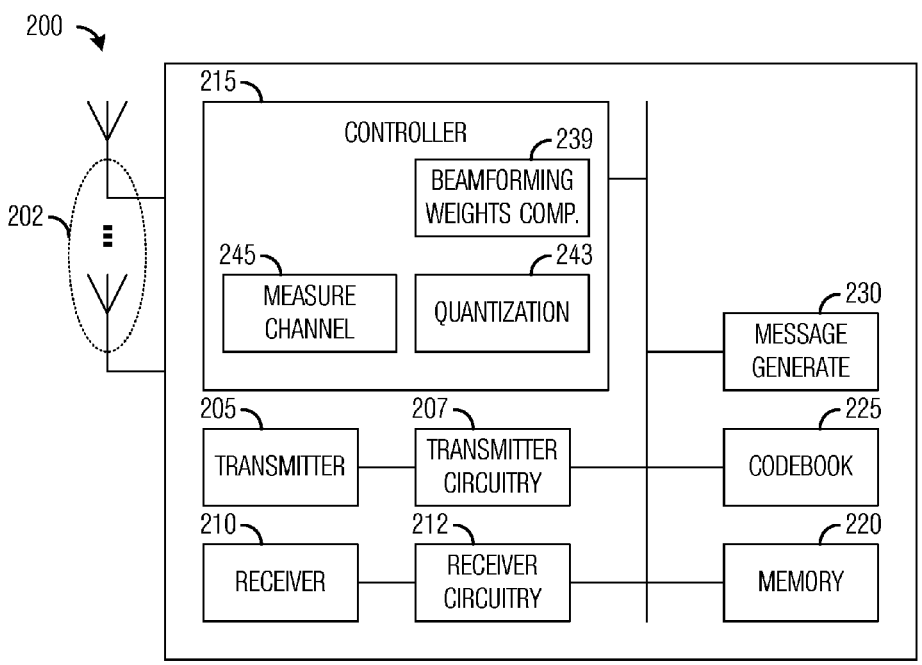
FIG. 2 is a diagram of a UE.

FIG. 2 illustrates a UE 200. UE 200 may be representative of a UE receiving CoMP transmissions and computing beamforming weights for use in CoMP transmissions. UE 200 may receive CoMP transmissions from any number of access points and in any of a variety of CoMP transmission forms, such as the three CoMP transmission forms discussed previously.

UE 200 may have at least two antennas 202. Antennas 202 may serve as both a transmit antennas and a receive antennas. Alternatively, UE 200 may have separate transmit and receive antennas. UE 200 may have equal numbers of transmit antennas and receive antennas or UE 200 may have a different number of transmit antennas and receive antennas.

Coupled to antennas 202 may be a transmitter 205 used to transmit information over the air using antennas 202. Transmitter circuitry 207 coupled to transmitter 205 may provide signal processing for information being transmitted. Examples of signal processing provided by transmitter circuitry 207 may include filtering, amplifying, modulating, error encoding, parallel-to-serial converting, interleaving, bit puncturing, and so forth. Also coupled to antennas 202 may be a receiver 210 used to receive information detected by antennas 202. Receiver circuitry 212 coupled to receiver 210 may provide signal processing for received information. Examples of signal processing provided by receiver circuitry 212 may include filtering, amplifying, demodulating, error detecting and correcting, serial-to-parallel converting, de-interleaving, and so on.

A controller 215 may be a processing unit responsible for executing applications and programs, controlling operations of various components of UE 200, interacting with base stations, relay nodes, and so forth. In addition to the above listed operations, controller 215 may be responsible for computing beamforming weights used in CoMP transmissions to UE 200. UE 200 also includes a memory 320 for storing applications and data, including beamforming weights.

Controller 215 includes functional blocks that may be used to compute the beamforming weights, including a beamforming weights compute unit 239, a quantization unit 243, and a measure channel unit 245.

Beamforming weights compute unit 239 may be used to compute a value of the beamforming weights based on a previous iteration of the beamforming weights, as well as the transmit power of the access points, channel conditions of communications channels between the access point and the UE, and so forth.

Additionally, beamforming weights compute unit 239 may be used to compute a value of a cost function, such as the cost function J discussed previously. Solving for the cost function may be equivalent to maximizing the capacity of the communications system by determining specific values for the beamforming weights. According to an embodiment, the cost function J may be solved iteratively until the solution of the cost function converges, i.e., consecutive solutions of the cost function changes by less than a threshold.

Furthermore, beamforming weights compute unit 239 may be used to select initial values for the beamforming weights. According to an embodiment, beamforming weights compute unit 239 may select an arbitrary value for the initial values of the beamforming weights. For example, any non-zero vector may be selected as initial values of the beamforming weights.

Also, beamforming weights compute unit 239 may be used to determine if the computing of the cost function has finished. According to an embodiment, the computing of the cost function has finished when the value of the cost function has converged to a value. In other words, the computing of the cost function has finished when consecutive values of the cost function changes by less than the threshold. The magnitude of the threshold may be set depending on factors such as desired accuracy, available computing resources, available computation time, and so forth.

The beamforming weights computed by beamforming weights compute unit 239 may be fedback to the access points. The beamforming weights may be quantized by quantization unit 243 to reduce feedback overhead. According to an embodiment, quantization unit 243 may make use of codebook quantization to quantize the beamforming weights. Codebook 225 may be used by quantization unit 243. According to an embodiment, the beamforming weights may be individually quantized to help reduce the size of codebook 225.

Quantization unit 243 may select a codeword based on a codeword selection function that best matches a beamforming weight and a message generate unit 230 may generate a feedback message to send an index corresponding to the selected codeword in codebook 225 back to the access points. In order to reduce feedback overhead, the feedback message may include indices to codewords corresponding to each beamforming weight. As an example, if there are two beamforming weights, the feedback message may contain two codeword indices.

Measure channel unit 245 may be used to measure a channel between UE 200 and each access point transmitting to UE 200. Measurements of the channels may be based on pilot signals, reference sequences, or other transmissions made by the access points.

To further reduce feedback overhead, the feedback message may be appended to another message being transmitted to the access points, such as a hybrid automatic response requested (HARQ) acknowledgement.

Figure 3:
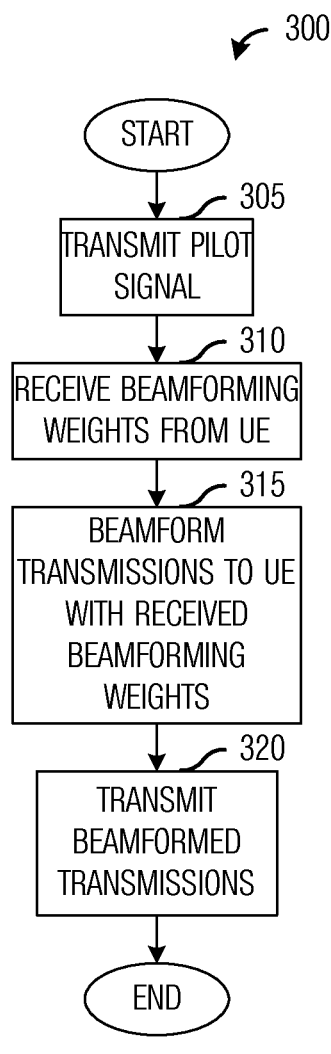
FIG. 3 is a flow diagram of access point operations in transmitting information to a UE, wherein the transmitted information is part of a CoMP transmission.

FIG. 3 illustrates a flow diagram of access point operations 300 in transmitting information to a UE, wherein the transmitted information is part of a CoMP transmission. Access point operations 300 may be indicative of operations occurring in an access point, such as a base station or a relay node, as the access point participates in CoMP transmission to a UE. Access point operations 300 may occur while the access point is participating in CoMP transmission with at least one other access point, which may be another base station, relay node, or another sector of the same base station, and as long as there is information to transmit to the UE.

Access point operations 300 may begin with the access point transmitting a pilot signal that may be used by UEs served by the access point to measure a channel between the UE and the access point (block 305). According to an embodiment, rather than transmitting a pilot signal, the access point may transmit a reference sequence. According to another embodiment, the access point may not transmit either a pilot signal or a reference sequence. Instead, the UE may measure the channel by measuring transmissions made by the access point.

After transmitting the pilot signal, the access point may receive the beamforming weights from the UE (block 310). According to an embodiment, the beamforming weights may be provided by the UE to the access point in the form of indices to codewords in a codebook used to quantize the beamforming weights. Furthermore, the access point may receive indices to all beamforming weights to be used in CoMP transmission to the UE. However, the access point may make use of only a subset of the indices. By transmitting all indices in a single message, the UE may be able to reduce feedback overhead.

The access point may then beamform its transmissions to the UE using the received beamforming weight (block 315). According to an embodiment, the transmissions to the UE may be multiplied with the received beamforming weight. The beamformed transmissions may then be transmitted to the UE (block 320) and access point operations 300 may then terminate.

Figure 4:
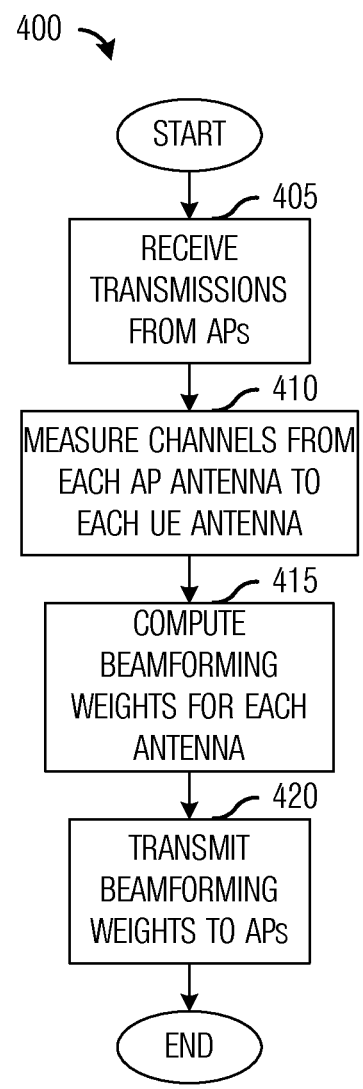
FIG. 4 is a flow diagram of UE operations in providing beamforming weights to access points for CoMP transmission.

FIG. 4 illustrates a flow diagram of UE operations 400 in providing beamforming weights to access points for CoMP transmission. UE operations 400 may be indicative of operations occurring in a UE as the UE participates in CoMP transmission with two or more access points. UE operations 400 may occur while the UE is participating in CoMP transmission with at least two access points, which may be base stations, relay nodes, or a combination thereof, and as long as there is information to transmit to the UE.

UE operations 400 may begin with the UE receiving transmissions of pilot signals from the access points (block 405). The pilot signals may be used by the UE to measure a channel between the UE and each of the access points (block 410). According to an embodiment, rather than the pilot signals, the access points may transmit a reference sequence or no special sequence at all. If the access points transmit a reference sequence, the UE may make use of the special sequence to measure the channels. However, if the access points do not transmit either the pilot signal or the reference sequence, the UE may measure transmissions made by the access points over a period of time to measure the channels.

The UE may then compute beamforming weights for use by each of the access points to beamform transmissions to the UE (block 415). According to an embodiment, the UE may make use of the cost function discussed previously to compute the beamforming weights. However, the evaluation of the cost function may be computationally complex and the UE may use an iterative technique to compute the beamforming weights. A detailed discussion of the computing of the beamforming weights is provided below.

With the beamforming weights computed, the UE may transmit the beamforming weights to the access points (block 420) and UE operations 400 may then terminate. In an attempt to reduce feedback overhead, the UE may quantize the beamforming weights. According to an embodiment, the UE may make use of codebook quantization to quantize the beamforming weights. To reduce codebook quantization complexity, the UE may individually quantize the beamforming weights. By individually quantizing the beamforming weights, a smaller codebook may be used, thereby reducing the storage requirements of the codebook and quantization complexity.

In FDD communications systems, the beamforming weights must be fedback to the access points.

Figure 5:
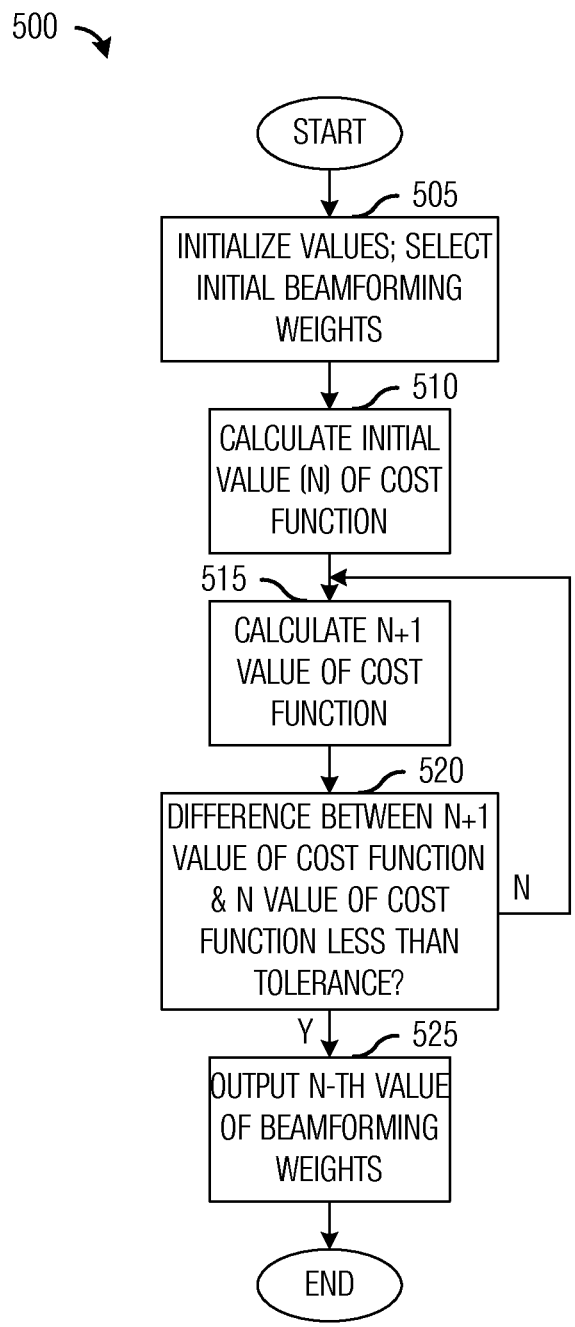
FIG. 5 is a flow diagram of UE operations in computing beamforming weights for use in CoMP transmission.
Figure 6A:
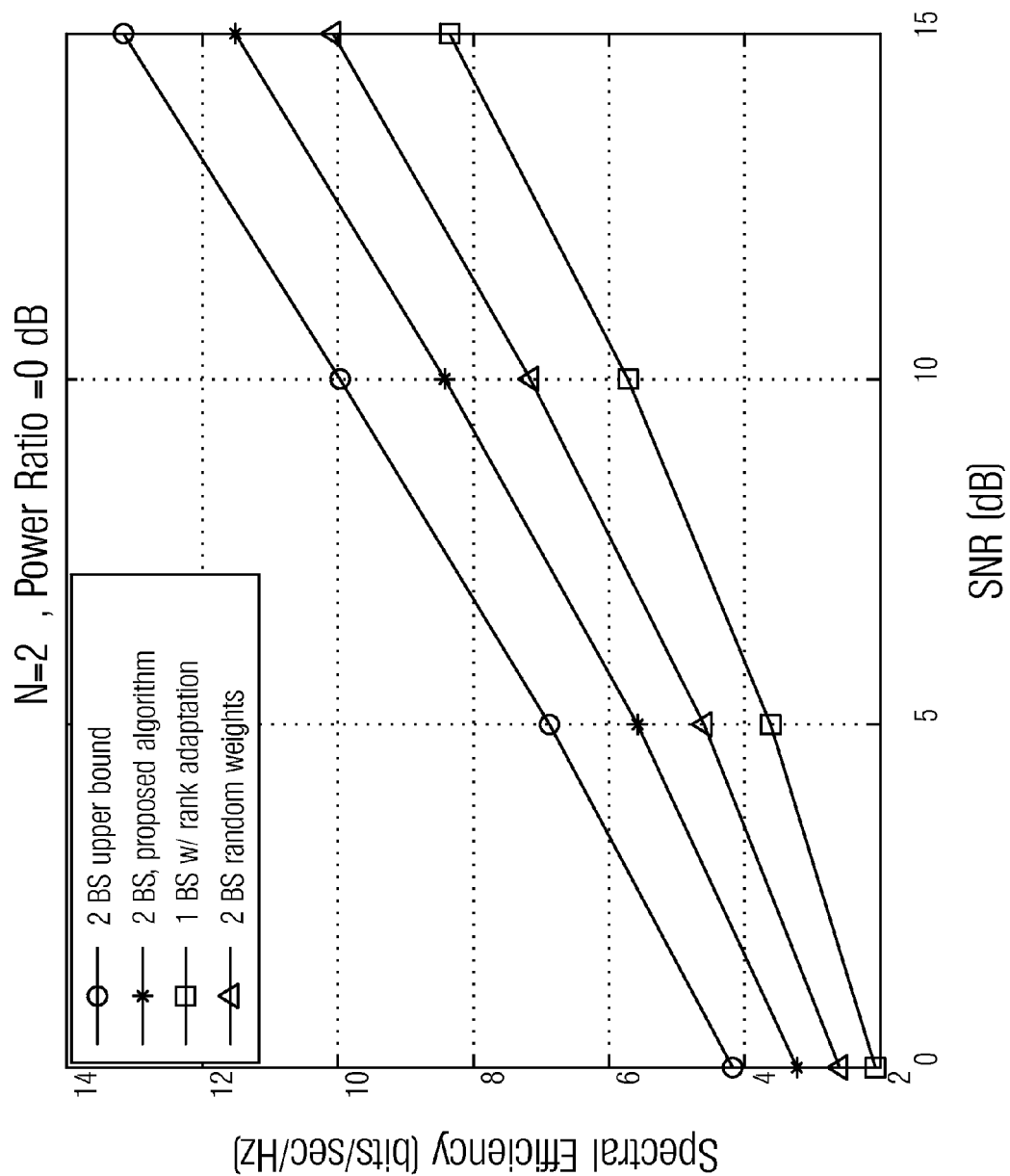
FIGS. 6a through 6f are plots of spectral efficient versus SNR for a variety of communications system configurations.
Figure 6B:
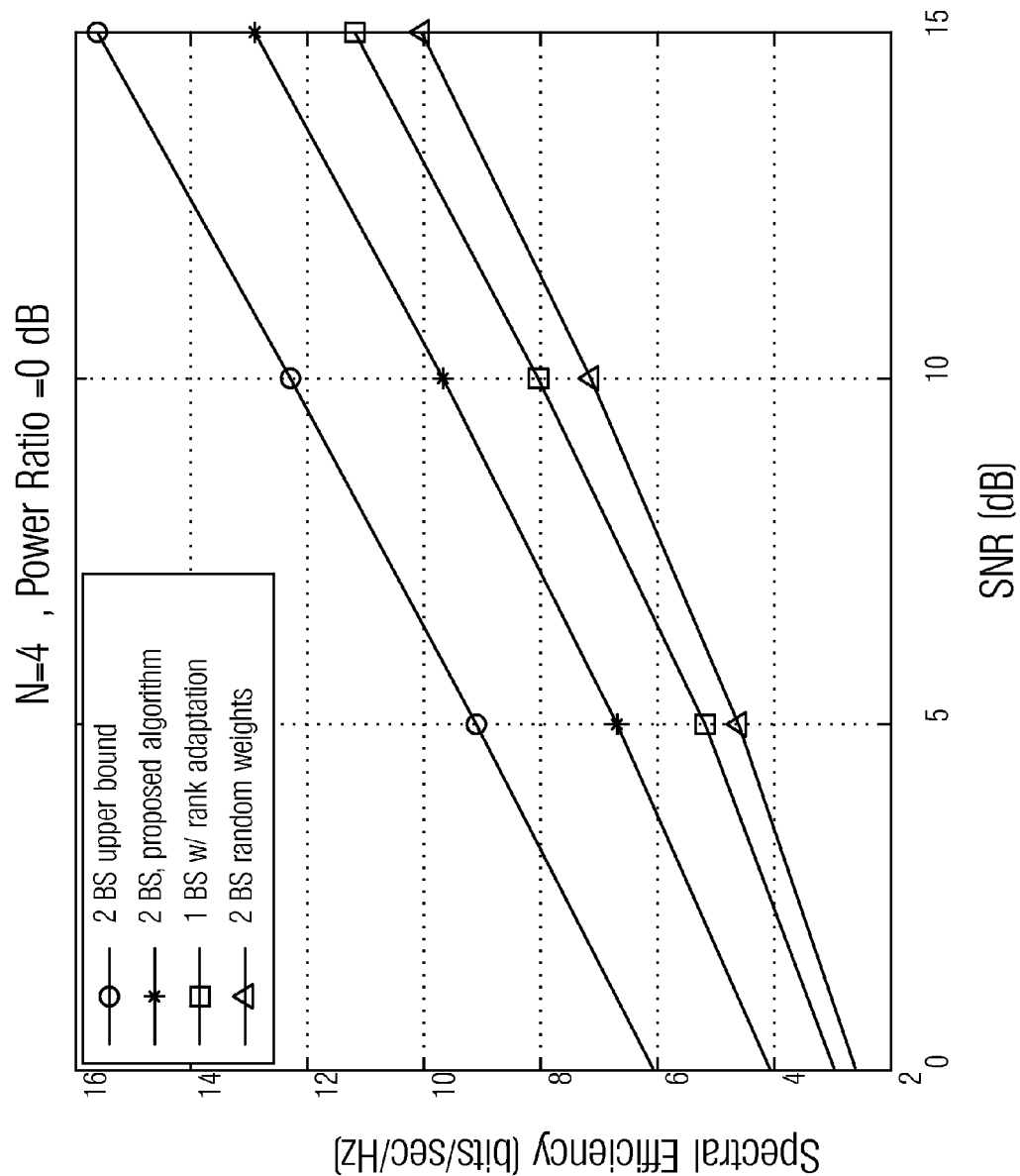
Figure 6C:
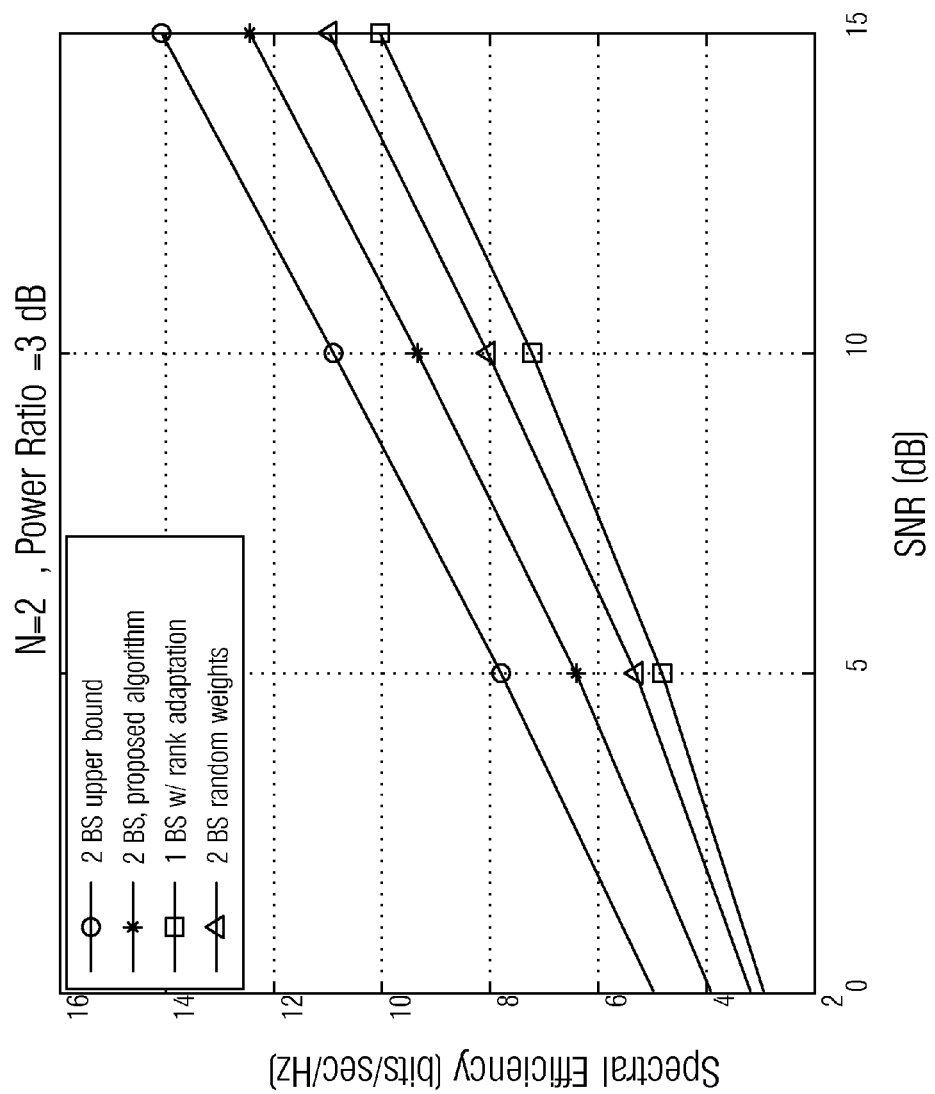
Figure 6D:
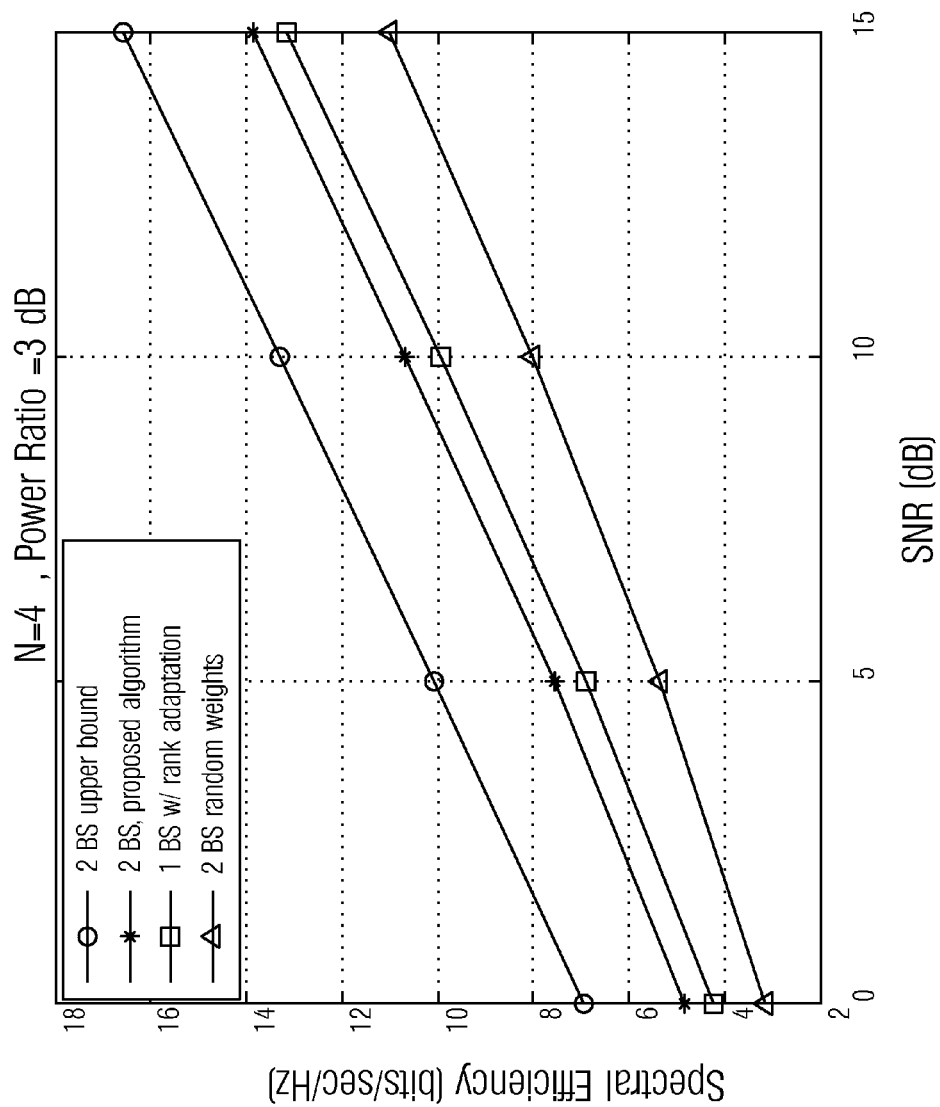
Figure 6E:
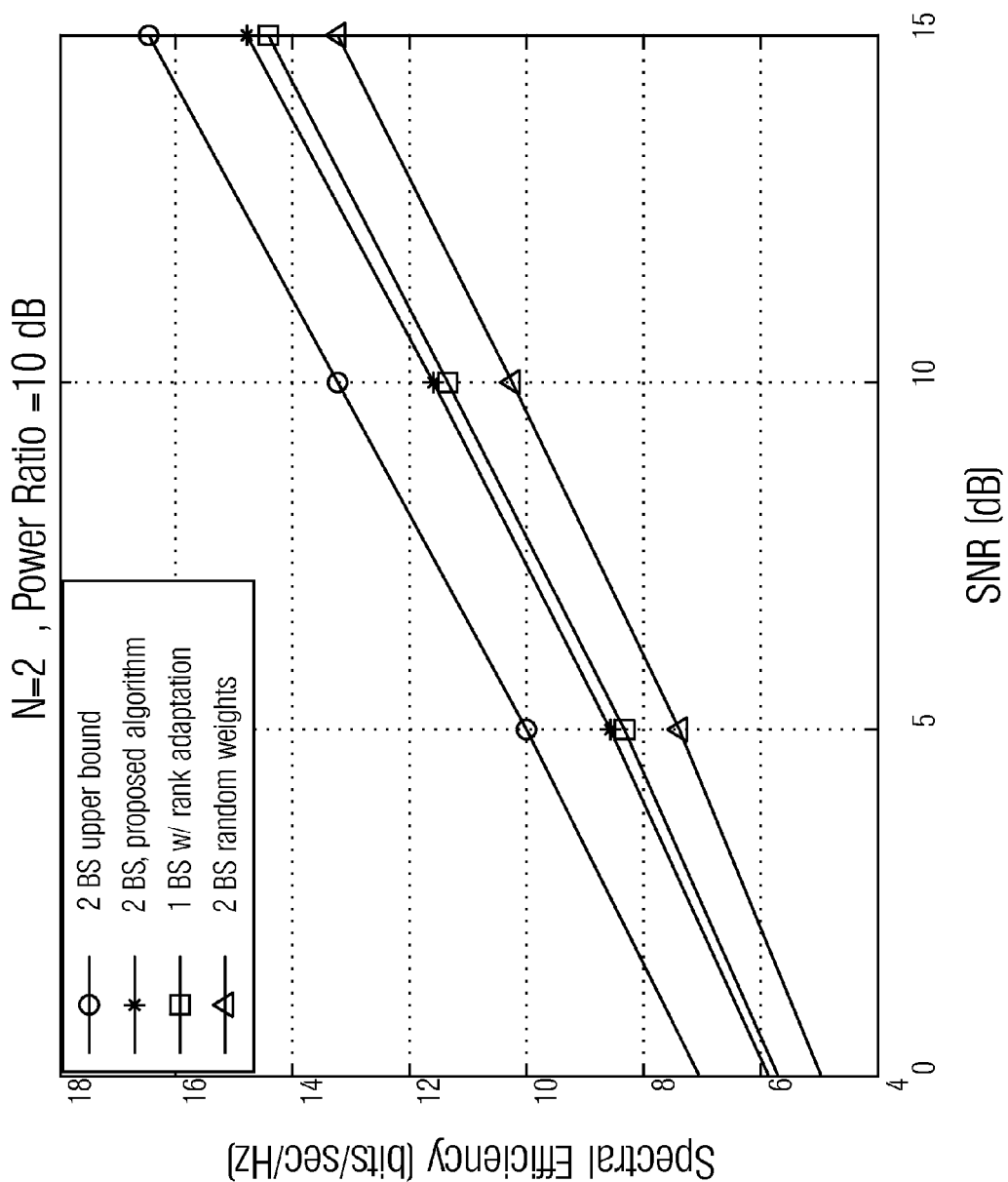
Figure 6F:
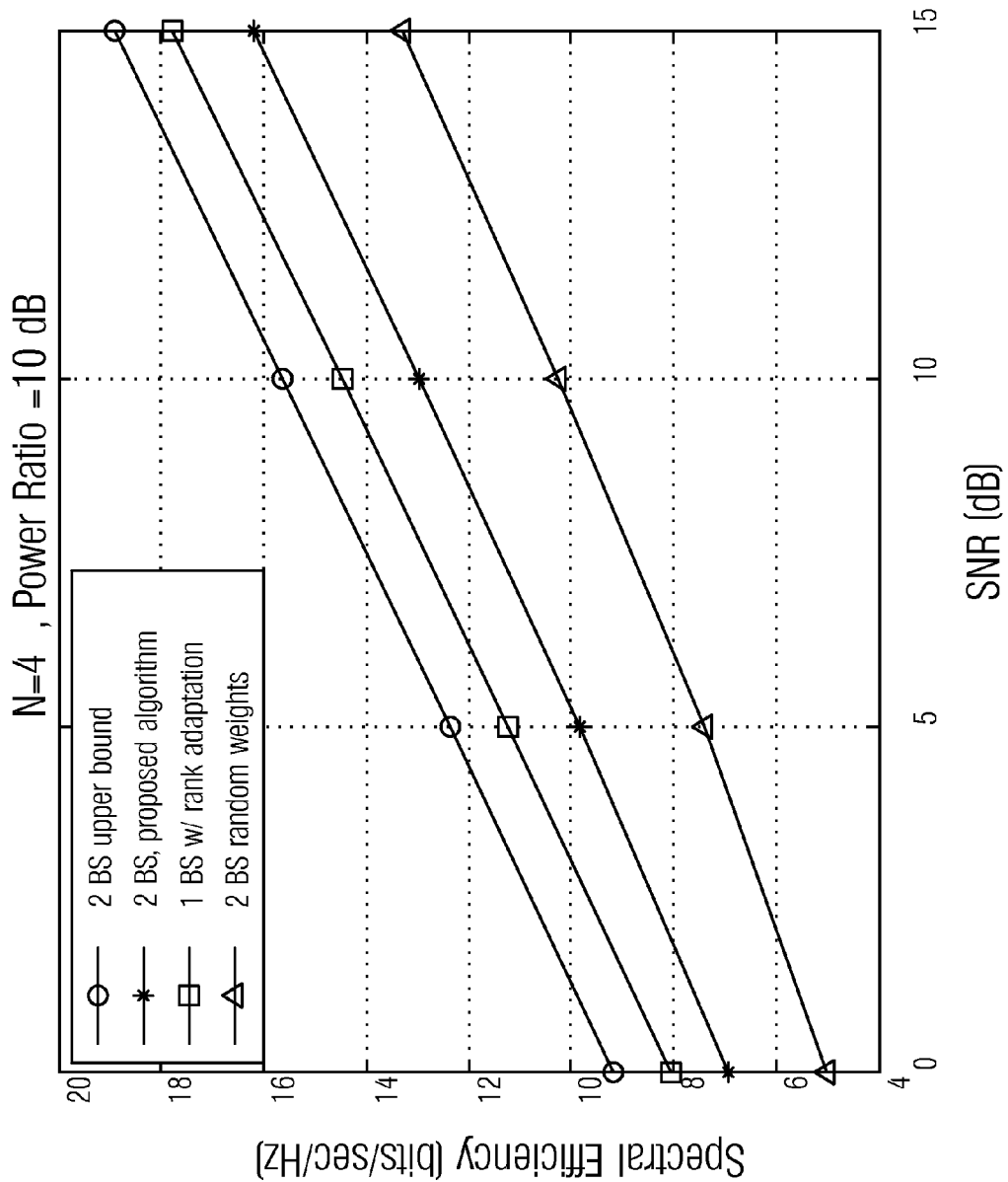

FIG. 5 illustrates a flow diagram of UE operations 500 in computing beamforming weights for use in CoMP transmission. UE operations 500 may be indicative of operations occurring in a UE as the UE computes beamforming weights to provide to access points that are participating in CoMP transmission to the UE. UE operations 500 may occur while the UE is in a normal operating mode and while there are two or more access points transmitting to the UE. UE operations 500 may be an implementation of computing beamforming weights for each antenna (block 415 of FIG. 4).

Solving the cost function J presented previously may prove to be computationally intractable. Instead, it may be possible to use a gradient method to find a numerical solution to compute the beamforming weights. Computing the beamforming weights using the gradient method may be expressed as $$\frac{1}{2}\frac{\partial J}{\partial w_1} = \left[\left(w_2^H A_{22} w_2 + \frac{1}{P_2}\right) \cdot A_{11} - A_{12} w_2 w_2^H A_{12}^H\right] w_1$$

$$\frac{1}{2}\frac{\partial J}{\partial w_2} = \left[\left(w_1^H A_{11} w_1 + \frac{1}{P_1}\right) \cdot A_{22} - A_{12}^H w_1 w_1^H A_{12}\right] w_2.$$

Similar to power iteration, it may be possible to iteratively find optimal directions (the beamforming weights) by iterating the beamforming vectors on the direction of the gradient (followed by normalization at each iteration).

UE operations 500 may begin with the UE initializing values and selecting initial beamforming weights (block 505). According to an embodiment, initializing values may include computing values for $A_{11}$, $A_{22}$, $A_{12}$, $P_1$, $P_2$, and tolerance, where $A_{11}=h_{11}h_{11}^H+h_{21}h_{21}^H$, $A_{12}=h_{11}h_{12}^H+h_{21}h_{22}^H$, $A_{22}=h_{12}h_{12}^H+h_{22}h_{22}^H$, $P_1$ and $P_2$ are total transmit power to the UE from access point one and access point two, respectively, and tolerance is a threshold used to determine a terminating condition for the gradient method. According to an embodiment, the initial beamforming weights may arbitrarily selected. For example, any non-zero vectors may be selected for the initial beamforming weights.

The UE may then compute an initial value for the cost function J, J(n) where n=0 (block 510). According to an embodiment, the initial value for the cost function may be computed using expression $$J = \frac{1}{P_1 P_2}\det(I_2 + H^H H)$$
$$= \left(w_1^H A_{11} w_1 \cdot w_2^H A_{22} w_2 - |w_1^H A_{12} w_2|^2\right) +$$
$$\frac{1}{P_2} \cdot w_1^H A_{11} w_1 + \frac{1}{P_1} \cdot w_2^H A_{22} w_2.$$

The UE may then compute a value for the cost function J for n=n+1 (block 515). According to an embodiment, computing the value of the cost function J for n=n+1 may occur over several steps, the steps may include a) $w_1(n+1) = \left[\left(w_2^H(n)A_{22}w_2(n) + \frac{1}{P_2}\right) \cdot A_{11} - A_{12}w_2(n)w_2^H(n)A_{12}^H\right]w_1(n);$ b) $w_1(n+1) = \frac{w_1(n+1)}{\|w_1(n+1)\|};$ c) $w_2(n+1) = \left[\left(w_1^H(n)A_{11}w_1(n) + \frac{1}{P_1}\right) \cdot A_{22} - A_{12}^H w_1(n)w_1^H(n)A_{12}\right]w_2(n);$ d) $w_2(n+1) = \frac{w_2(n+1)}{\|w_2(n+1)\|};$ e) calculate J(n+1);
f) increment n;

The UE may perform a check to determine if the cost function has converged (block 520). According to an embodiment, the cost function may be deemed to have converged if a difference between consecutive values of the cost function, e.g., J(n) and J(n+1), is less than tolerance. If the consecutive values of the cost function are not less than tolerance, then the UE may return to block 515 to calculate the cost function for the next value of n.

If the consecutive values of the cost function are less than tolerance, then the UE may output the n-th value of the beamforming weights as the beamforming weights (block 525) and UE operations 500 may then terminate.

The gradient method may have an exponential convergence rate and is numerically stable. Furthermore the gradient method may be extended to situations with more than two access points and/or UEs with more than two antennas.

Optimal beamforming weights may not be orthogonal since they are designed to maximize the cost function J. In high signal to noise ratio (SNR) situations, a high-SNR approximation for the cost function J may be used that ignores the contributions of the $$\frac{1}{P_1}$$

and the $$\frac{1}{P_2}$$

terms in the iterative steps.

FIGS. 6a through 6f illustrate plots of spectral efficient versus SNR for a variety of communications system configurations. Assumptions made include an independent and identically distributed (iid) Rayleigh fading channel model, the UE has two antennas and the access points have either two or four antennas, and there are no directional out of cell interference sources. Three cases of SNR for two access point (shown in plots as BS) cases were considered: 0 dB (equal power), 3 dB, and 10 dB. For a one access point case, only the access point with stronger channel communicates with the UE with rank adaptation assumed. The measured quantity is ergodic (average) Shannon capacity and an upper bound for the two access points case is when the two access points are seen as a large array by the UE.

As shown in FIGS. 6a through 6f, the performance of the embodiments usually match that of the upper bound for the two access points case and usually better than the one access point case and the two access points case with random beamforming weights. Substantial gain may be achieved when the access points have two antennas. When there is a large disparity between received SNR from two access points, benefit from CoMP transmission may still be achieved if each access point has two antennas.

Tables 1-3 present summaries of the results shown in FIGS. 6a through 6f.

TABLE 1

Relative gain with respect to single access point transmission (0 dB).

|  |  | SNR = 0 dB | SNR = 5 dB | SNR = 10 dB | SNR = 15 dB |
|---|---|---|---|---|---|
| $P_1/P_2$ = 0 dB | N = 2 | 54.95% | 54.69% | 47.71% | 38.17% |
|  | N = 4 | 36.69% | 29.14% | 20.52% | 15.25% |

TABLE 1

Relative gain with respect to single access point transmission (3 dB).

|  |  | SNR = 0 dB | SNR = 5 dB | SNR = 10 dB | SNR = 15 dB |
|---|---|---|---|---|---|
| $P_1/P_2$ = 3 dB | N = 2 | 33.40% | 33.25% | 29.07% | 24.43% |
|  | N = 4 | 14.39% | 9.89% | 7.63% | 5.44% |

TABLE 1

Relative gain with respect to single access point transmission (10 dB).

|  |  | SNR = 0 dB | SNR = 5 dB | SNR = 10 dB | SNR = 15 dB |
|---|---|---|---|---|---|
| $P_1/P_2$ = 10 dB | N = 2 | 2.88% | 2.81% | 2.54% | 2.36% |
|  | N = 4 | −14.31% | −12.5% | −10.4% | −9.0% |

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications device operations, the method comprising:
receiving transmissions from at least two access points;
measuring channels between the communications device and each of the at least two access points in accordance with the received transmissions;
computing beamforming weights in accordance with the measured channels, wherein the computing is in accordance with attempting to maximize a capacity of a communications system containing the communications device and the at least two access points with the beamforming weights, and wherein the attempting to maximize the capacity comprises computing a value of a cost function in accordance with the measured channels and the beamforming weights, and determining a convergence of the value of the cost function;

transmitting the beamforming weights to the at least two access points; and receiving coordinated multi-point (CoMP) transmissions from the at least two access points, wherein each of the (CoMP) transmissions is beamformed using one of the beamforming weights, and wherein the at least two access points comprises first and second access points, each having two transmit antennas, wherein the communications device includes two antennas, and wherein computing beamforming weights comprises determining $w_1$ and $w_2$ such that a capacity function expressible as $$C_{max} = \max_{\substack{w_1, w_2 \\ \|w_1\|=1, \|w_2\|=1}} C(w_1, w_2)$$

is maximized, where $w_1$ and $w_2$ are the beamforming weights, and C is the capacity of the communications system and is expressible as $$C(w_1, w_2) = \log_2 \det(I_2 + H^H H),$$

where $$H = \begin{bmatrix} \sqrt{P_1} \cdot h_{11}^H w_1 & \sqrt{P_2} \cdot h_{12}^H w_2 \\ \sqrt{P_1} \cdot h_{21}^H w_1 & \sqrt{P_2} \cdot h_{22}^H w_2 \end{bmatrix},$$

$I_2$ is an identity matrix, $h_{11}^H$ and $h_{21}^H$ are downlink channel vectors from the first access point to a first antenna and a second antenna of the communications device, respectively, $h_{12}^H$ and $h_{22}^H$ are downlink channel vectors from the second access point to the first antenna and the second antenna of the communications device, respectively, and $P_1$ and $P_2$ are total transmit power to the communications device from the first access point and the second access point, respectively.

2. The method of claim 1, wherein the transmissions comprise pilot signals, or reference sequences.

3. The method of claim 1, wherein the transmissions comprise information transmissions, and wherein measuring the channels comprises measuring the information transmissions for an extended amount of time.

4. The method of claim 1, wherein computing beamforming weights comprises maximizing a cost function J in terms of $w_1^H$ and $w_2^H$, the cost function J is expressible as $$J = \frac{1}{P_1 P_2} \det(I_2 + H^H H)$$
$$= \left(w_1^H A_{11} w_1 \cdot w_2^H A_{22} w_2 - |w_1^H A_{12} w_2|^2\right) +$$
$$\frac{1}{P_2} \cdot w_1^H A_{11} w_1 + \frac{1}{P_1} \cdot w_2^H A_{22} w_2,$$

where $A_{11} = h_{11} h_{11}^H + h_{21} h_{21}^H$, $A_{12} = h_{11} h_{12}^H + h_{21} h_{22}^H$, and $A_{22} = h_{12} h_{12}^H + h_{22} h_{22}^H$.

5. The method of claim 4, wherein maximizing the cost function J comprises utilizing a numeric method to calculate the beamforming weights.

6. The method of claim 5, wherein utilizing the numeric method comprises calculating $$\frac{1}{2} \frac{\partial J}{\partial w_1} = \left[\left(w_2^H A_{22} w_2 + \frac{1}{P_2}\right) \cdot A_{11} - A_{12} w_2 w_2^H A_{12}^H\right] w_1$$

and $$\frac{1}{2} \frac{\partial J}{\partial w_2} = \left[\left(w_1^H A_{11} w_1 + \frac{1}{P_1}\right) \cdot A_{22} - A_{12}^H w_1 w_1^H A_{12}\right] w_2.$$

7. The method of claim 6, wherein the numeric method comprises a gradient method.

8. The method of claim 6, wherein utilizing the numeric method comprises:

selecting initial values for computed beamforming weights, $w_1(n)$ and $w_2(n)$, where n=0;

calculating an initial value for the cost function J, J(n);

calculating updated values for the computed beamforming weights, $w_1(n+1)$ and $w_2(n+1)$;

calculating an updated value for the cost function J, J(n+1);

repeating the calculating the updated values, the calculating the updated value, and incrementing n until the updated value of the cost function, J(n+1), converges; and selecting the computed beamforming weights, $w_1(n)$ and $w_2(n)$, as the beamforming weights.

9. The method of claim 8, wherein the initial values of the computed beamforming weights are non-zero vectors.

10. The method of claim 8, wherein the updated value of the cost function converges when an absolute value of J(n)−J(n+1) is less than a threshold.

11. The method of claim 1, further comprising quantizing the beamforming weights prior to the transmitting the beamforming weights.

12. The method of claim 11, wherein quantizing the beamforming weights comprises quantizing each of the beamforming weights using codebook quantization.

13. The method of claim 11, wherein the beamforming weights are individually quantized.

14. A method for operations at a first access point, the method comprising:

transmitting a pilot signal;

receiving beamforming weights from a communications device served by the first access point, wherein the first access point and at least one additional access point is transmitting to the communications device using coordinated multi-point transmission over channels measured by the communications device, wherein the beamforming weights are used to beamform transmissions to the communications device, the beamforming weights having been computed at the communications device in accordance with the measured channels and in accordance with an attempt to maximize a capacity of a communications system containing the communications device, the first access point, and the at least one additional access point, wherein the attempt to maximize the capacity includes computing a value of a cost function in accordance with the measured channels and the beamforming weights, and determining a convergence of the value of the cost function;

beamforming a transmission with the beamforming weights; and transmitting the beamformed transmission to the communications device, wherein the at least one additional access point comprises a second access point, wherein the first and second access points each has two transmit antennas, wherein the communications device includes two antennas, and wherein the beamforming weights comprise $w_1$ and $w_2$ such that a capacity function expressible as $$C_{max} = \max_{\substack{w_1, w_2 \\ \|w_1\|=1, \|w_2\|=1}} C(w_1, w_2)$$

is maximized, where $w_1$ and $w_2$ are the beamforming weights, and C is the capacity of the communications system and is expressible as $$C(w_1, w_2) = \log_2 \det(I_2 + H^H H),$$

where $$H = \begin{bmatrix} \sqrt{P_1} \cdot h_{11}^H w_1 & \sqrt{P_2} \cdot h_{12}^H w_2 \\ \sqrt{P_1} \cdot h_{21}^H w_1 & \sqrt{P_2} \cdot h_{22}^H w_2 \end{bmatrix},$$

$I_2$ is an identity matrix, $h_{11}^H$ and $h_{21}^H$ are downlink channel vectors from the first access point to a first antenna and a second antenna of the communications device, respectively, $h_{12}^H$ and $h_{22}^H$ are downlink channel vectors from the second access point to the first antenna and the second antenna of the communications device, respectively, and $P_1$ and $P_2$ are total transmit power to the communications device from the first access point and the second access point, respectively.

15. The method of claim 14, wherein the receiving beamforming weights comprises receiving a quantized version of the beamforming weights.

16. The method of claim 15, wherein the quantized version of the beamforming weights comprises indices to codewords in a codebook used to quantize the beamforming weights.

17. The method of claim 14, wherein the receiving beamforming weights comprises:
receiving the beamforming weights; and
selecting a beamforming weight from the beamforming weights.

18. A communications device comprising:
a receiver to be coupled to a receive antenna in order to receive signals detected by the receive antenna;
a transmitter to be coupled to a transmit antenna in order to transmit signals with the transmit antenna; and
a controller coupled to the receiver and to the transmitter, the controller configured to measure a channel between the communications device and an access point of a plurality of access points transmitting to the communications device, and to compute beamforming weights for use by the plurality of access points transmitting to the communications device in coordinated multi-point transmissions, wherein the controller computes the beamforming weights in accordance with attempting to maximize a capacity of a communications system containing the communications device and the access points, wherein the controller comprises
a measure channel unit configured to measure channels between the communications device and each access point in the plurality of access points in accordance with transmissions made by each access point; and
a beamforming weights compute unit coupled to the measure channel unit and configured to iteratively compute values of the beamforming weights in accordance with the channel measurements, to compute a value of a cost function in accordance with the channel measurements and the beamforming weights, and to determine a convergence of the value of the cost function, and wherein the plurality of access points comprises first and second access points, each having two transmit antennas, wherein the communications device includes two antennas, and wherein the beamforming weights compute unit configured to compute the values of the beamforming weights comprises the beamforming weights compute unit configured to determine $w_1$ and $w_2$ such that a capacity function expressible as $$C_{max} = \max_{\substack{w_1, w_2 \\ \|w_1\|=1, \|w_2\|=1}} C(w_1, w_2)$$

is maximized, where $w_1$ and $w_2$ are the beamforming weights, and C is the capacity of the communications system and is expressible as $$C(w_1, w_2) = \log_2 \det(I_2 + H^H H),$$

where $$H = \begin{bmatrix} \sqrt{P_1} \cdot h_{11}^H w_1 & \sqrt{P_2} \cdot h_{12}^H w_2 \\ \sqrt{P_1} \cdot h_{21}^H w_1 & \sqrt{P_2} \cdot h_{22}^H w_2 \end{bmatrix},$$

$I_2$ is an identity matrix, $h_{11}^H$ and $h_{21}^H$ are downlink channel vectors from the first access point to a first antenna and a second antenna of the communications device, respectively, $h_{12}^H$ and $h_{22}^H$ are downlink channel vectors from the second access point to the first antenna and the second antenna of the communications device, respectively, and $P_1$ and $P_2$ are total transmit power to the communications device from the first access point and the second access point, respectively.

19. The communications device of claim 18, wherein the controller further comprises a quantization unit coupled to the beamforming weights compute unit, the quantization unit configured to quantize the beamforming weights.

20. The communications device of claim 19, wherein the quantization unit is further configured to individually quantize each of the beamforming weights using codebook quantization.

* * * * *

UNITED STATES PATENT AND TRADEMARK OFFICE
CERTIFICATE OF CORRECTION

PATENT NO. : 8,681,644 B2
APPLICATION NO. : 12/784092
DATED : March 25, 2014
INVENTOR(S) : Shahab Sanayei et al.

It is certified that error appears in the above-identified patent and that said Letters Patent is hereby corrected as shown below:

In the Specification:

In Col. 4, line 32, Detailed Description of Illustrative Embodiments, delete
" $y_1 = \sqrt{P_1} \cdot h_{11}{}^H q_1 \cdot s_1 + \sqrt{P_2} \cdot h_{12}{}^H w_2 \cdot n_1$ " and insert -- $y_1 = \sqrt{P_1} \cdot h_{11}^H w_1 \cdot s_1 + \sqrt{P_2} \cdot h_{12}^H s_2 + n_1$ --.

In Col. 4, line 34, Detailed Description of Illustrative Embodiments, delete
" $y_2 = \sqrt{P_1} \cdot h_{21}{}^H q_1 \cdot s_1 + \sqrt{P_2} \cdot h_{22}{}^H w_2 \cdot n_1$ " and insert -- $y_2 = \sqrt{P_1} \cdot h_{21}^H w_1 \cdot s_1 + \sqrt{P_2} \cdot h_{22}^H w_2 \cdot s_2 + n_2$ --.

In Col. 4, line 36, Detailed Description of Illustrative Embodiments, delete " $h_{11}{}^H$ and $h_{21}{}^H$ " and insert -- $h_{11}^H$ and $h_{21}^H$ --.

In Col. 4, line 38, Detailed Description of Illustrative Embodiments, delete " $h_{12}{}^H$ and $h_{22}{}^H$ " and insert -- $h_{12}^H$ and $h_{22}^H$ --.

In Col. 4, line 40, Detailed Description of Illustrative Embodiments, delete " $w_1{}^H$ and $w_2{}^H$ " and insert -- $w_1^H$ and $w_2^H$ --.

In Col. 5, line 10, Detailed Description of Illustrative Embodiments, delete " $w_1{}^H$ and $w_2{}^H$ " and insert -- $w_1^H$ and $w_2^H$ --.

In Col. 5, lines 21-22, Detailed Description of Illustrative Embodiments, delete
" $A_{11} = h_1 h_{11}{}^H + h_{21} h_{21}{}^H, A_{12} = h_1 h_{12}{}^H + h_{21} h_{22}{}^H$, and $A_{22} = h_{12}{}^H h_{12}{}^H + h_{22} h_{22}{}^H$ " and
insert -- $A_{11} = h_{11} h_{11}^H + h_{21} h_{21}^H, A_{12} = h_{11} h_{21}^H + h_{21} h_{22}^H$, and $A_{22} = h_{12}^H h_{12}^H + h_{22} h_{22}^H$ --.

In Col. 8, lines 42-43, Detailed Description of Illustrative Embodiments, delete
" $A_{11} = h_1 h_{11}{}^H + h_{21} h_{21}{}^H, A_{12} = h_{11} h_{12}{}^H + h_{21} h_{22}{}^H$, $A_{22} = h_{12} h_{12}{}^H + h_{22} h_{22}{}^H$ " and
insert -- $A_{11} = h_{11} h_{11}^H + h_{21} h_{21}^H, A_{12} = h_{11} h_{21}^H + h_{21} h_{22}^H$, $A_{22} = h_{12} h_{12}^H + h_{22} h_{22}^H$ --.

Signed and Sealed this
Seventeenth Day of June, 2014

Michelle K. Lee
*Deputy Director of the United States Patent and Trademark Office*

CERTIFICATE OF CORRECTION (continued)
U.S. Pat. No. 8,681,644 B2

In the Claims:

In Col. 11, line 37, claim 1, delete "$h_{11}{}^H$ and $h_{21}{}^H$" and insert -- $h_{11}^H$ and $h_{21}^H$ --.

In Col. 11, line 40, claim 1, delete "$h_{12}{}^H$ and $h_{22}{}^H$" and insert -- $h_{12}^H$ and $h_{22}^H$ --.

In Col. 11, line 53, claim 4, delete "$w_1{}^H$ and $w_2{}^H$" and insert -- $w_1^H$ and $w_2^H$ --.

In Col. 11, lines 63-64, Detailed Description of Illustrative Embodiments, delete "$A_{11} = h_{11}h_{11}{}^H + h_{21}h_{21}{}^H, A_{12} = h_{11}h_{12}{}^H + h_{21}h_{22}{}^H,$ and $A_{22} = h_{12}h_{12}{}^H + h_{22}h_{22}{}^H$" and insert -- $A_{11} = h_{11}h_{11}^H + h_{21}h_{21}^H, A_{12} = h_{11}h_{21}^H + h_{21}h_{22}^H,$ and $A_{22} = h_{12}h_{12}^H + h_{22}h_{22}^H$ --.

In Col. 13, line 27, claim 14, delete "$h_{11}{}^H$ and $h_{21}{}^H$" and insert -- $h_{11}^H$ and $h_{21}^H$ --.

In Col. 13, line 30, claim 14, delete "$h_{12}{}^H$ and $h_{22}{}^H$" and insert -- $h_{12}^H$ and $h_{22}^H$ --.

In Col. 14, line 42, claim 18, delete "$h_{11}{}^H$ and $h_{21}{}^H$" and insert -- $h_{11}^H$ and $h_{21}^H$ --.

In Col. 14, line 45, claim 18, delete "$h_{12}{}^H$ and $h_{22}{}^H$" and insert -- $h_{12}^H$ and $h_{22}^H$ --.